US008612780B2

(12) United States Patent
Hsin et al.

(10) Patent No.: US 8,612,780 B2
(45) Date of Patent: Dec. 17, 2013

(54) METHOD AND APPARATUS FOR MODIFYING POWER MANAGEMENT CONFIGURATION OF A COMPUTER TO ACCOMMODATE A PACKET PROCESSING LATENCY POLICY ASSOCIATED WITH A PATTERN

(75) Inventors: Chih-Fan Hsin, Portland, OR (US);
Shian Tsai, Jr., Portland, OR (US);
Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 12/882,956

(22) Filed: Sep. 15, 2010

(65) Prior Publication Data

US 2012/0066520 A1 Mar. 15, 2012

(51) Int. Cl.
*G06F 1/00* (2006.01)
(52) U.S. Cl.
USPC ....................................... 713/300
(58) Field of Classification Search
USPC ....................................... 713/300
See application file for complete search history.

(56) References Cited

U.S. PATENT DOCUMENTS

| 7,188,264 B2 | 3/2007 | Morisawa |
| 2008/0059813 A1* | 3/2008 | Khodorkovsky et al. ..... 713/300 |
| 2009/0063878 A1 | 3/2009 | Schmidt et al. |
| 2009/0094468 A1 | 4/2009 | Larson |
| 2009/0180477 A1* | 7/2009 | Akahane ................ 370/392 |
| 2010/0153590 A1 | 6/2010 | Hsin et al. |
| 2010/0250978 A1* | 9/2010 | Nakamura ............. 713/300 |

FOREIGN PATENT DOCUMENTS

KR    20090034639 A    4/2009

OTHER PUBLICATIONS

"Intel® 82580 Quad/Dual Gigabit Ethernet LAN Controller Datasheet", LAN Access Division (LAD), 321027-017EN, Revision: 2.45, Oct. 2010, 716 pages.
"Advanced Configuration and Power Interface Specification", Revision 4.0a, Apr. 5, 2010, 731 pages.
"Compare Intel® Products", Barton Hills, Retrieved on: Dec. 30, 2010, 3 pages, Webpage Available at: http://ark.intel.com/Compare.aspx?ids=48762,41280.
Torres, Gabriel, "Everything You Need to Know About the CPU C-States Power Saving Modes", Hardware Secrets, Sep. 5, 2008, 8 Pages.
International Search Report and Written Opinion from corresponding International application No. PCT/US2011/049728, filed Aug. 30, 2011; ISR mailed Feb. 27, 2012; 9 pages.

* cited by examiner

*Primary Examiner* — Thomas Lee
*Assistant Examiner* — Xuxing Chen
(74) *Attorney, Agent, or Firm* — Christopher K. Gagne (57) ABSTRACT

An embodiment may include network controller circuitry that may be comprised, at least in part, in a host computer. The circuitry may determine, at least in part, based at least in part upon at least one comparison, whether at least one power management action is to be initiated. The at least one comparison may compare, at least in part, at least one pattern with at least one portion of at least one packet received, at least in part, by the host computer. The at least one power management action may include the modification, at least in part, of at least one power management configuration of the host computer. The modification may accommodate, at least in part, at least one packet processing latency policy associated, at least in part, with the at least one pattern. Of course, many alternatives, variations, and modifications are possible without departing from this embodiment.

18 Claims, 4 Drawing Sheets

METHOD AND APPARATUS FOR MODIFYING POWER MANAGEMENT CONFIGURATION OF A COMPUTER TO ACCOMMODATE A PACKET PROCESSING LATENCY POLICY ASSOCIATED WITH A PATTERN

FIELD

This disclosure relates to network controller circuitry to determine, at least in part, whether at least one power management action is to be initiated.

BACKGROUND

In one conventional arrangement, a network server receives packets from a network. The server includes a processor to process the packets. The processor is capable of operating in various power modes depending upon the operational state of the processor. For example, in order to reduce power consumption, when the processor is in an idle state because the processor is not actively processing packets, the processor is capable of operating in a number of relatively lower power modes of operation compared to relatively higher power mode of operation that may prevail when the processor is actively processing packets. If, when the processor is operating in one of the relatively lower power modes, it is desired that the processor processes packets, the processor transitions from this lower power mode to the higher power mode to enable it to process the packets. This transition results in a delay in processing the packets that corresponds to the lower power mode of operation in which the processor was previously operating. For example, transition from the lowest power mode results in the greatest delay, and the delay decreases as the relative power level of the low power mode increases.

Depending upon the particular type and/or priority of network traffic with which the packets may be associated and/or the usage model to which the server is being put, the degree to which such packet processing delays may be considered acceptable may vary. It is common for a server to encounter different types and/or priorities of network traffic, and/or for a server to be used in connection with different usage models. This may lead to an undesirably large amount of user time and effort being consumed to design and implement server power management schemes that attempt to appropriately reduce the processor's power consumption while not inappropriately increase packet processing delays.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
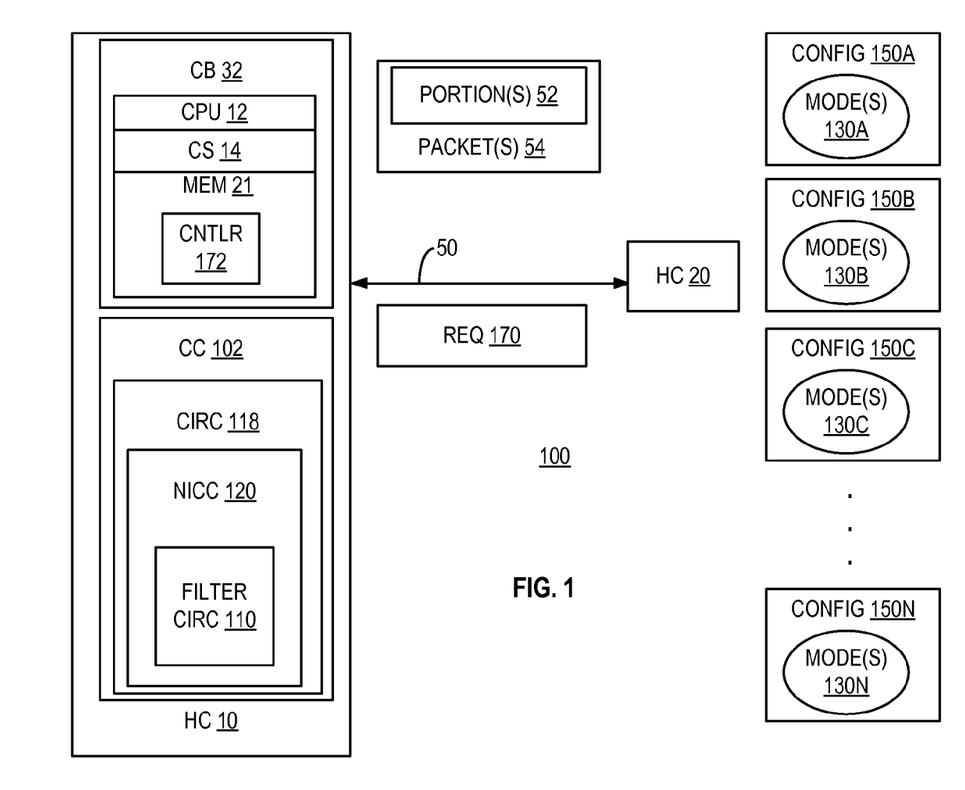
FIG. 1 illustrates a system embodiment.

FIG. 1 illustrates a system embodiment 100. System 100 may include one or more host computers (HC) 10 that may be communicatively coupled via one or more communication links 50 to one or more other host computers 20. HC 20 may comprise, at least in part, respective components as, and/or may operate, at least in part, in a manner that is substantially similar or identical to HC 10. In this embodiment, the terms "host computer," "host," "server," "network node," and "node" may be used interchangeably, and may mean, for example, in general, one or more machines and/or devices capable of performing one or more logical and/or arithmetic operations, such as, without limitation, one or more end stations, smart phones, tablet computers, appliances, intermediate stations, network interfaces, clients, servers, and/or portions thereof. In this embodiment, a "network" or "communication link" may be used interchangeably, and may be or comprise any mechanism, instrumentality, modality, and/or portion thereof that permits, facilitates, and/or allows, at least in part, two or more entities to be communicatively coupled together, such as, for example, one or more wired and/or wireless networks, at least in part. Also in this embodiment, a first entity may be "communicatively coupled" to a second entity if the first entity is capable of transmitting to and/or receiving from the second entity one or more commands and/or data. In this embodiment, a "wireless network" means a network that permits, at least in part, at least two entities to be wirelessly communicatively coupled, at least in part. In this embodiment, a "wired network" means a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an "instruction" may include data and/or one or more commands. In this embodiment, a "packet" may comprise one or more symbols and/or values.

Host computer 10 may comprise a system motherboard/circuit board (CB) 32. CB 32 may include one or more single and/or multi-core host central processing units (CPU) 12, one or more chipsets 14, and computer-readable/writable memory 21. One or more chipsets 14 may comprise, for example, not shown memory and/or input/output controller/hub circuitry. One or more chipsets 14 may be capable of communicatively coupling, at least in part, one or more CPU 12 to memory 21 and/or circuit board (CB) 102.

In this embodiment, a "processor," "processor core," "core," and "central processing unit" may be used interchangeably, and may comprise circuitry capable of performing, at least in part, one or more arithmetic and/or logical operations. Also in this embodiment, a "controller" may comprise, at least in part, one or more processors and/or one or more processes executed, at least in part, by one or more processors and/or one or more chipsets. In this embodiment, "circuitry" may comprise, for example, singly or in any combination, analog circuitry, digital circuitry, hardwired circuitry, programmable circuitry, co-processor circuitry, state machine circuitry, and/or memory (e.g., firmware memory) that may comprise program instructions (e.g., driver instructions) that may be executed by programmable circuitry.

Although not shown in the Figures, host computer 10 and/or host computer 20 each may comprise a respective graphical user interface system. The not shown respective graphical user interface systems may comprise, e.g., respective keyboards, pointing devices, and display systems that may permit one or more human users to input commands to, and monitor the operation of, host computer 10, node 20, and/or system 100.

Circuit card 102 in HC 10 may comprise operative circuitry 118. Operative circuitry 118 may comprise network interface controller circuitry (NICC) 120 that may comprise packet filter circuitry 110.

CB 32 also may comprise a not shown bus system and a not shown bus card slot. Card 102 may include a not shown bus connector that may be capable of being electrically and mechanically coupled to the bus card slot that may be comprised in the CB 32. When the bus connector of card 102 is so coupled to the bus card slot comprised in motherboard 32, operative circuitry 118 may become communicatively coupled to (e.g., chipset 14) in CB 32.

Alternatively, without departing from this embodiment, some or all of the operative circuitry 118 of card 102 may not be comprised in card 102, but instead, may be comprised in other structures, systems, and/or devices. These other structures, systems, and/or devices may be, for example, comprised in motherboard 32 (e.g., as part of CPU 12 and/or chipset 14). Further alternatively or additionally, some or all of the functionality of operative circuitry 118 may be comprised, at least in part, in a not shown network driver and/or other process executed in host 10. Also without departing from this embodiment, some or all of the functions, operations, and/or components of chipset 14 may be comprised in CPU 12.

One or more machine-readable program instructions may be stored in computer-readable/writable memory 21. In operation of HC 10, these instructions may be accessed and executed by circuitry 118, circuitry 120, circuitry 110, and/or one or more CPU 12. When so executed, these one or more instructions may result, at least in part, in circuitry 118, circuitry 120, circuitry 110, and/or one or more CPU 12 performing the operations described herein as being performed by these components of HC 10. Also when so executed, these one or more instructions may result, at least in part, in one or more power management controllers 172 being executed, at least in part, by circuitry 118, circuitry 120, circuitry 110, and/or one or more CPU 12, and/or being resident, at least in part, in memory 21. In this embodiment, one or more controllers 172 may be or comprise one or more processes that may, but are not required to be, comprised, at least in part, in a not shown operating system environment. In this embodiment, an operating system environment may comprise one or more portions of one or more operating systems and/or one or more applications. Also in this embodiment, a process, program, driver, operating system, and application may be used interchangeably, and may comprise, and/or result at least in part from execution of, one or more program instructions and/or threads. Computer-readable/writable memory 21 may comprise one or more of the following types of memories: semiconductor firmware memory, programmable memory, non-volatile memory, read only memory, electrically programmable memory, random access memory (e.g., static and/or dynamic random access memory), flash memory, magnetic disk memory, optical disk memory, and/or other or later-developed computer-readable and/or writable memory.

In operation of HC 10, one or more controllers 172 may be capable of implementing, at least in part, at least one, and in this embodiment, a plurality of power management configurations 150A, 150B, 150C, ... 150N of HC 10. These power management configurations 150A, 150B, 150C, ... 150N may comprise and/or be associated, at least in part, with respective power modes 130A, 130B, 130C, ... 130N of CPU 12. In this embodiment, a power management configuration may request, implement, indicate, specify, and/or facilitate, at least in part, one or more power consumption and/or operational modes of one or more portions of one or more entities.

In this embodiment, a power consumption mode or power mode may be used interchangeably, and may comprise one or more operational modes that are associated, at least in part, with one or more power consumption rates and/or levels. In this embodiment, a portion of an entity may comprise all or less than all of the entity.

For example, one or more configurations 150N may be or comprise one or more fully powered-up and/or fully operational modes of host 10. Accordingly, one or more power modes 130N may be or comprise, for example, a fully powered-up and/or operating mode (e.g., C0 operating mode) of CPU 12. Conversely, one or more configurations 150A may be or comprise one or more maximally low power modes of operation of host 10 (e.g., short of fully powering down host 10). Accordingly, when operating in one or more power modes 130A, all of the power saving features that may be implementable via all of the possible low power modes of the CPU 12 may be enabled. Such low power modes may include, for example, C1, C1E, C3, and/or C6 modes.

For example, in the C1 (e.g., halt) mode, the CPU's main internal clocks (not shown) may be stopped via software command. In the C1E (e.g., enhanced halt) mode, the CPU's main internal clocks may be stopped by software command, and CPU voltage may be reduced. In the C3 (e.g., sleep) mode, all of the CPU's internal and/or external clocks may be stopped, and CPU voltage may be reduced. In the C6 (e.g., deep power down) mode, the CPU's internal voltage may be lowered to a predetermined value (e.g., zero volts). Prior to entering the C6 mode, the CPU 12 may save its internal state to an independently-powered static random access memory (not shown) from which the CPU 12 may restore its internal state when the CPU 12 exits the C6 mode. Of course, the specific number of and/or features enabled by the power modes and/or power management configurations in this embodiment may vary, depending upon, for example, the type of CPU 12 and/or other components comprised in host 10.

One or more configurations 150B may be or comprise one or more low power modes of operation of host 10 that may exhibit increased power consumption relative to one or more configurations 150A, but less power consumption than one or more configurations 150C and 150N. Accordingly, when operating in one or more power modes 130B, the power saving features that may be implementable via low power modes C1, C1E, and C3 of the CPU 12 may be enabled. Conversely, one or more configurations 150C may be or comprise one or more low power modes of operation of host 10 that may exhibit increased power consumption relative to one or more configurations 150B, but less power consumption than one or more configurations 150N. Accordingly, when operating in one or more power modes 130B, the power saving features that may be implementable via low power modes C1 and/or C1E of the CPU 12 may be enabled.

Although in the above, power modes 130A, 130B, 130C, ... 130N have been described as involving, at least in part, power modes of CPU 12, alternatively or additionally, without departing from this embodiment, power modes 130A, 130B, 130C, ... 130N may correspond to, at least in part, and/or comprise, at least in part, other and/or additional power modes that may be implementable in and/or by HC 10. For example, in this embodiment, power modes 130A, 130B, 130C, ... 130N may correspond to, at least in part, and/or comprise, at least in part, Sx, Gx, Dx, Cx, Px, and/or other and/or additional power modes, such as, generally described in Advanced Configuration and Power Interface Specification, Revision 4.0a, Apr. 5, 2010, by Hewlett-Packard Corporation et al. Of course, this is merely exemplary, and power modes 130A, 130B, 130C, . . . 130N may comprise other and/or additional types of power modes, without departing from this embodiment.

Figure 2:
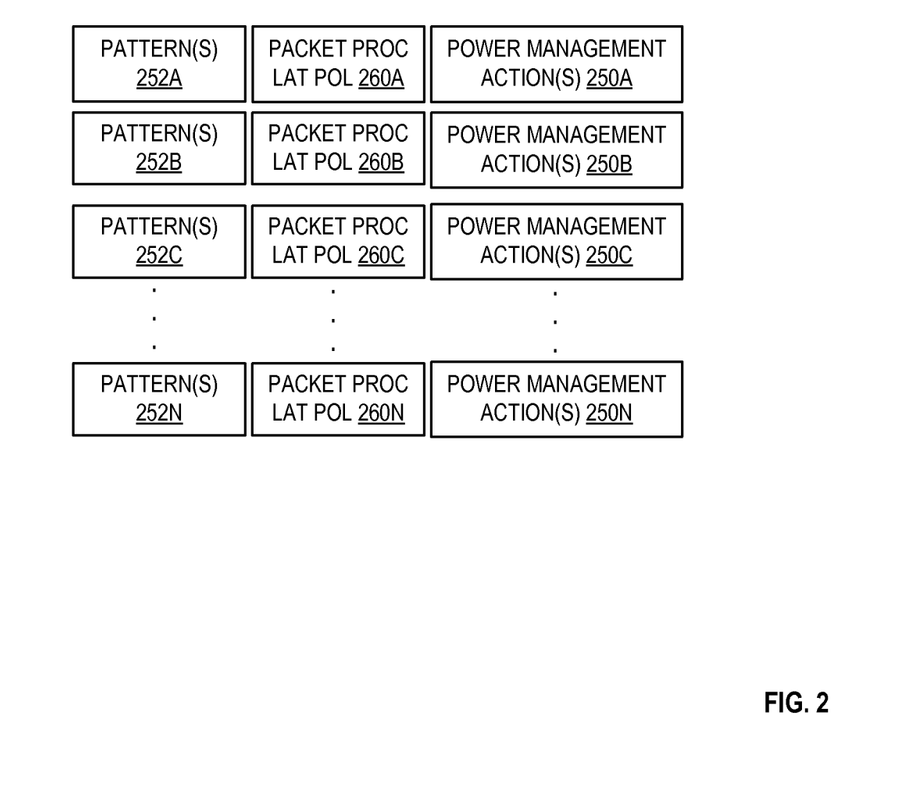
FIG. 2 illustrates features in an embodiment.

With reference to FIG. 2, in this embodiment, each of the one or more power management configurations 150A, 150B, 150C, . . . 150N may be associated, at least in part, with one or more respective packet processing latency policies 260A, 260B, 260C, . . . 260N. Each of the policies 260A, 260B, 260C, . . . 260N may be associated, at least in part, with one or more respective patterns 252A, 252B, 252C, . . . 252N, and one or more respective power management actions 250A, 250B, 250C, . . . 250N.

For example, in this embodiment, one or more patterns 252A may be or comprise the absence of the other patterns 252B, 252C, . . . 252N for an associated predetermined time period. That is, during operation of system 100, host 10 may receive packet traffic. Filter circuitry 110 may compare the traffic to patterns 252B, 252C, . . . 252N. If filter circuitry 110 determines that no portion of the traffic matches any of the patterns 252B, 252C, . . . 252N during the predetermined time period, this may be considered by circuitry 110, circuitry 120, and/or circuitry 118 to be a match of one or more patterns 252A. One or more patterns 252A may be associated, at least in part, with one or more packet processing latency policies 260A. In this example, one or more latency policies 260A may indicate and/or specify, at least in part, that the traffic is of the lowest priority for processing, and therefore, may be permitted to encounter the longest permitted delay in processing (e.g., by CPU 12). Consequently, the one or more power management actions 250A that may be associated, at least in part, with one or more policies 260A, may be designed to allow the maximum possible power consumption savings to be achieved in host 10, without dropping of packet traffic by host 10. Accordingly, one or more actions 250A may comprise modifying, at least in part, one or more currently enabled power management configurations to accommodate, at least in part, the one or more latency policies 260A associated, at least in part, with the one or more patterns 252A. For example, if one or more configurations 150A are not currently enabled, one or more actions 250A may comprise exiting the one or more currently enabled power management configurations and entering, at least in part, one or more power management configurations 150A. Conversely, if one or more configurations 150A are currently enabled, one or more actions 250A may comprise maintaining enablement, at least in part, of one or more configurations 150A. While one or more configurations 150A are enabled, circuitry 118 and/or circuitry 120 may store received packet traffic for later processing by the CPU 12. This later processing may occur, when one or more configurations 150N are enabled at a later time, e.g., as a result of a periodically generated interrupt signal.

Conversely, filter circuitry 110 may determine that one or more portions 52 of one or more packets 54 in the traffic matches, at least in part, one or more patterns 252B during a respective associated predetermined time period. In this example, the one or more latency policies 260B that may be associated, at least in part, with one or more patterns 252B may indicate and/or specify, at least in part, that the traffic is of a relatively higher priority (i.e., higher than that associated with one or more patterns 252A) for processing, and therefore, may be permitted to encounter relatively less delay in processing (e.g., by CPU 12) relative to the delay that may be permitted for traffic associated with one or more patterns 252A. Consequently, the one or more power management actions 250B that may be associated, at least in part, with one or more policies 260B, may be designed to permit relatively lower power consumption savings and relatively reduced packet processing latency to be achieved in host 10. Accordingly, one or more actions 250B may comprise modifying, at least in part, one or more currently enabled power management configurations to accommodate, at least in part, the one or more latency policies 260B associated, at least in part, with the one or more patterns 252B. For example, if one or more configurations 150B are not currently enabled, one or more actions 250B may comprise exiting the one or more currently enabled power management configurations and entering, at least in part, one or more power management configurations 150B. Conversely, if one or more configurations 150B are currently enabled, one or more actions 250B may comprise maintaining enablement, at least in part, of one or more configurations 150B. While one or more configurations 150B are enabled, circuitry 118 and/or circuitry 120 may store received packet traffic for later processing by the CPU 12 (e.g., when one or more configurations 150N are enabled at a later time, e.g., as a result of the periodically generated interrupt signal).

Conversely, filter circuitry 110 may determine that one or more portions 52 of one or more packets 54 in the traffic matches, at least in part, one or more patterns 252C during a respective associated predetermined time period. In this example, the one or more latency policies 260C that may be associated, at least in part, with one or more patterns 252C may indicate and/or specify, at least in part, that the traffic is of a relatively higher priority (i.e., higher than that associated with one or more patterns 252B) for processing, and therefore, may be permitted to encounter relatively less delay in processing (e.g., by CPU 12) relative to the delay that may be permitted for traffic associated with one or more patterns 252B. Consequently, the one or more power management actions 250C that may be associated, at least in part, with one or more policies 260C, may be designed to permit relatively lower power consumption savings and relatively reduced packet processing latency to be achieved in host 10 (e.g., relative to that associated with one or more patterns 252B). Accordingly, one or more actions 250C may comprise modifying, at least in part, one or more currently enabled power management configurations to accommodate, at least in part, the one or more latency policies 260C associated, at least in part, with the one or more patterns 252C. For example, if one or more configurations 150C are not currently enabled, one or more actions 250C may comprise exiting the one or more currently enabled power management configurations and entering, at least in part, one or more power management configurations 150C. Conversely, if one or more configurations 150C are currently enabled, one or more actions 250C may comprise maintaining enablement, at least in part, of one or more configurations 150C. While one or more configurations 150C are enabled, circuitry 118 and/or circuitry 120 may store received packet traffic for later processing by the CPU 12 (e.g., when one or more configurations 150N are enabled at a later time, e.g., as a result of the periodically generated interrupt signal).

Conversely, filter circuitry 110 may determine that one or more portions 52 of one or more packets 54 in the traffic matches, at least in part, one or more patterns 252N during a respective associated predetermined time period. In this example, the one or more latency policies 260N that may be associated, at least in part, with one or more patterns 252N may indicate and/or specify, at least in part, that the traffic is of the highest possible priority (i.e., higher than that associated with any of the other patterns) for processing, and therefore, may be permitted to encounter the least practicable delay in processing (e.g., by CPU 12) relative to the delay that may be permitted for traffic associated with any of the other patterns. Consequently, the one or more power management actions 250N that may be associated, at least in part, with one or more policies 260N, may be designed to permit the least practicable packet processing delay, and consequently, may involve the least (if any) power consumption savings to be achieved in host 10. Accordingly, one or more actions 250N may comprise modifying, at least in part, one or more currently enabled power management configurations to accommodate, at least in part, the one or more latency policies 260N associated, at least in part, with the one or more patterns 252N. For example, if one or more configurations 150N are not currently enabled, one or more actions 250N may comprise exiting the one or more currently enabled power management configurations and entering, at least in part, one or more power management configurations 150N. Conversely, if one or more configurations 150N are currently enabled, one or more actions 250N may comprise maintaining enablement, at least in part, of one or more configurations 150N. While one or more configurations 150N are enabled, circuitry 118 and/or circuitry 120 may forward the received packet traffic, as well as, any previously stored packet traffic, to the CPU 12 for processing.

Figure 3:
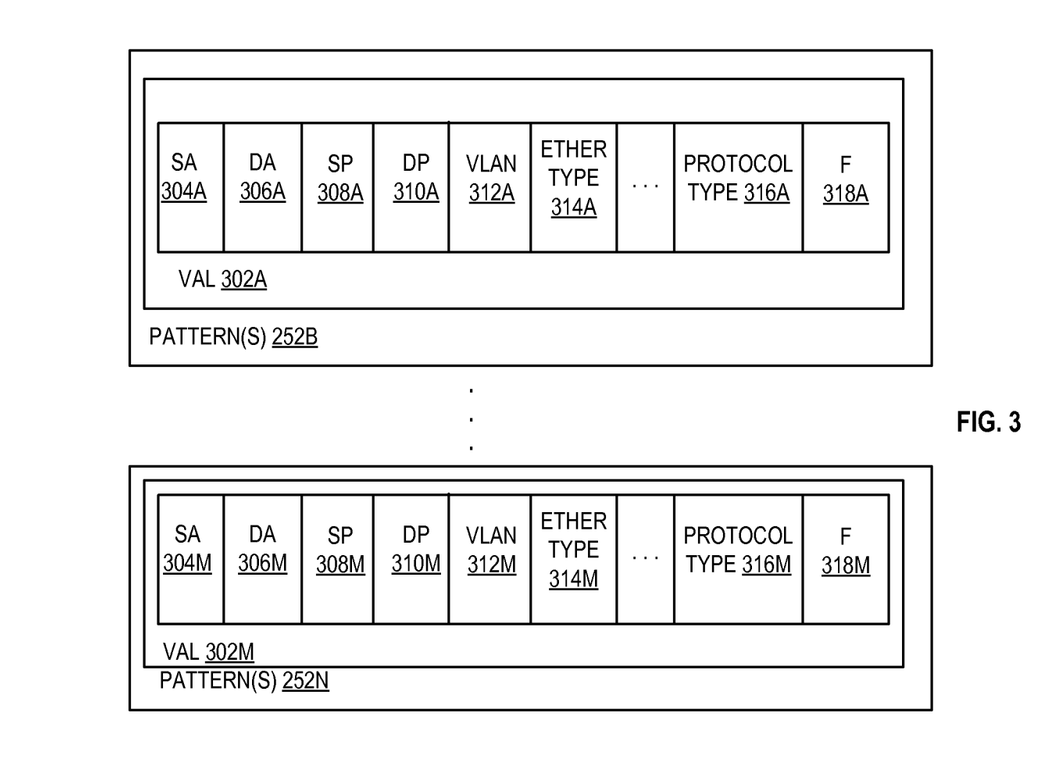
FIG. 3 illustrates features in an embodiment.

Turning to FIG. 3, each of the patterns 252B . . . 252N (i.e., all of the patterns 252A . . . 252N, except for one or more patterns 252A), may comprise, at least in part, one or more respective values 302A . . . 302M. Each of these respective values 302A . . . 302M may comprise and/or be associated with, at least in part, one or more respective source addresses (SA), one or more respective destination addresses (DA), one or more respective source ports (SP), one or more respective destination ports (DP), one or more respective virtual local area network (VLAN) tags, one or more Ethernet types, one or more respective protocol types, and/or one or more respective critical flags (F). For example, one or more values 302A may comprise and/or be associated with, at least in part, one or more SA 304A, one or more DA 306A, one or more SP 308A, one or more DP 310A, one or more VLAN tags 312A, one or more Ethernet types 314A, one or more protocol types 316A, and/or one or more critical flags 318A. Also, for example, one or more values 302N may comprise and/or be associated with, at least in part, one or more SA 304M, one or more DA 306M, one or more SP 308M, one or more DP 310M, one or more VLAN tags 312M, one or more Ethernet types 314M, one or more protocol types 316M, and/or one or more critical flags 318M. For each of these patterns 252B . . . 252N, these one or more respective values 302A . . . 302M may be selected so as to permit filter circuitry 110 to be able to determine, at least in part, whether one or more packets 54 are associated, at least in part, with one or more respective packet traffic flows that should be associated with, and processed according to, at least in part, policies 260B . . . 260N. For example, in this embodiment, the one or more respective SA, DA, SP, DP, VLAN tags, Ethernet types, and/or protocol types that may be comprised in, and/or associated with, at least in part, these one or more respective values may constitute respective packet flow information that if present, at least in part, in one or more portions 52 may indicate, at least in part, that one or more packets 54 belong, at least in part, to one or more respective flows that should be processed according to, at least in part, policies 260B . . . 260N. The one or more respective critical flags that may be comprised in, and/or associated with, at least in part, these one or more respective values, if present, at least in part, in one or more portions 52, may indicate and/or specify, at least in part, that one or more packets 54 should be processed according to, at least in part, one or more associated policies (e.g., one or more policies 260N for processing the highest priority packet traffic).

In this embodiment, one or more packets 54 may be compatible with, at least in part, one or more Ethernet, Transmission Control Protocol (TCP)/Internet Protocol (IP), and/or VLAN protocols. For example, these one or more Ethernet protocols may comply or be compatible with Institute of Electrical and Electronics Engineers, Inc. (IEEE) Std. 802.3-2008, Dec. 26, 2008. Also, for example, the one or more TCP/IP protocols may comply or be compatible with the protocols described in Internet Engineering Task Force (IETF) Request For Comments (RFC) 791 and 793, published September 1981. Additionally, the one or more VLAN protocols may comply or be compatible with IEEE Std. 802.1Q-2005, May 19, 2006. Accordingly, the one or more source and destination addresses, source and destination ports, Ethernet types, VLAN tags, and/or protocol types that may be comprised in and/or associated with, at least in part, these one or more values 302A . . . 302M may correspond to, comply and/or be compatible with, at least in part, corresponding, analogous, and/or similar fields and/or values that may be specified in these one or more Ethernet, TCP/IP, and/or VLAN protocols. However, many different, additional, and/or other protocols may be employed without departing from this embodiment. Additionally, one or more values 302A . . . 302M may comprise other, different, and/or additional types of values than those described herein without departing from this embodiment. For example, one or more values 302A . . . 302M may comprise one or more portions of one or more other fields (including, for example, one or more fields that may be outside of one or more packet headers and/or may be in accordance with one or more future protocols and/or future versions of the previous protocols), payload, and/or other data in and/or associated with, at least in part, one or more packets 54.

Figure 4:
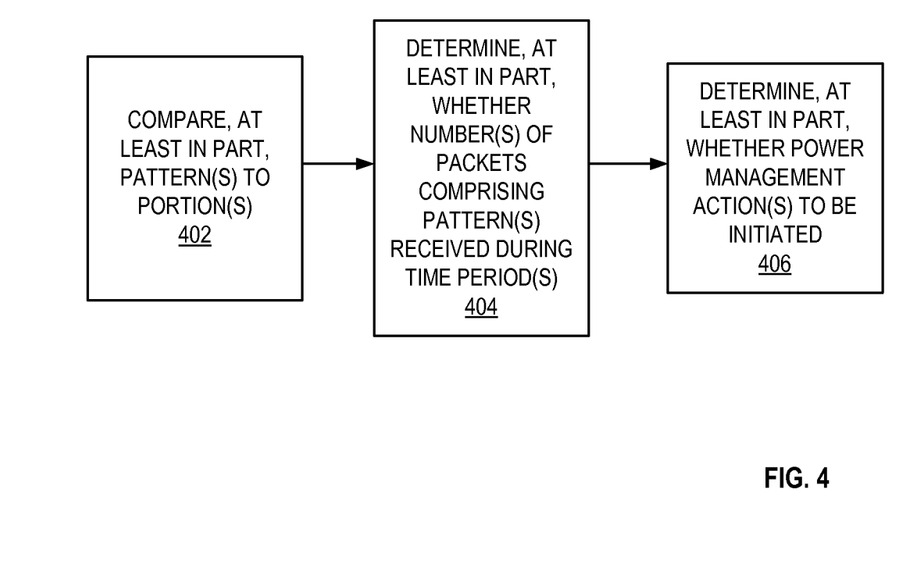
FIG. 4 illustrates operations in an embodiment.

Turning now to FIG. 4, in operation, circuitry 118, 120, and/or 110 of host 10 may receive, at least in part, one or more packets 54. Circuitry 110 may compare, at least in part, one or more (and in this embodiment, the plurality of) patterns 252A . . . 252N to one or more portions 52 of one or more packets 54, as illustrated by operation 402. In making this plurality of comparisons, filter circuitry 110 may compare each of patterns 252A . . . 252N with the one or more portions 52. Based at least in part upon this, circuitry 118 and/or 120 may determine, at least in part, whether one or more of the power management actions 250A . . . 250N is to be initiated (e.g., circuitry 118 and/or 110).

For example, circuitry 110, 120, and/or 118 may determine, at least in part, based at least in part upon these comparisons, whether respective predetermined numbers of packets comprising, at least in part, the respective patterns 252A . . . 252N have been received, at least in part, by host 10 during respective predetermined time periods (see operation 404 in FIG. 4). That is, each of the patterns 252A . . . 252N may be associated with a respective time period and a respective number of packets. Circuitry 110, 120, and/or 118 may determine, at least in part, whether host 10 receives (e.g., as part of one or more portions 52 in one or more packets 54), at least in part, during the respective associated time periods, the respective associated numbers of packets that comprise, at least in part, the respective patterns 252A . . . 252N. Based, at least in part, upon this, circuitry 110, 120, and/or 118 may determine, at least in part, whether one or more power management actions are to be initiated, as illustrated by operation 406 in FIG. 4.

If circuitry 110, 120, and/or 118 determines, at least in part, based at least in part upon the above comparisons, that one or more portions 52 of one or more packets 54 comprises, at least in part, one or more of the patterns 252A . . . 252N, and these one or more of the patterns have been comprised, at least in part, in the requisite number of packets and time period associated with these one or more of the patterns, circuitry 110, 120, and/or 118 may determine, at least in part, that the one or more respective packet processing latency policies associated, at least in part, with these one or more of the patterns, should be applied, at least in part, to the one or more packets 54. Circuitry 110, 120, and/or 118 then may determine, at least in part, that the one or more respective power management actions that are associated, at least in part, with these one or more respective packet processing latency policies are to be initiated. Circuitry 120 and/or 118 then may issue, at least in part, one or more requests 170 to one or more controllers 172 that may specify, request, command, and/or indicate, at least in part, that one or more controllers 172 are to execute, at least in part, these one or more respective power management actions. In response, at least in part, to one or more requests 170, one or more controllers 172 may execute, at least in part, the one or more respective power management actions.

By way of specific example, if, based at least in part upon the above comparisons, circuitry 110, 120, and/or 118 determines, at least in part, that one or more portions 52 of one or more packets 54 comprises, at least in part, one or more patterns 252B, and one or more patterns 252B have been comprised, at least in part, in the requisite number of packets and time period associated with one or more patterns 252B, circuitry 110, 120, and/or 118 may determine, at least in part, that one or more policies 260B should be applied, at least in part, to one or more packets 54. In this case, circuitry 110, 120, and/or 118 may determine, at least in part, that the one or more power management actions 250B associated, at least in part, with one or more patterns 252B and one or more policies 260B, are to be initiated.

If circuitry 110, 120, and/or 118 determines, at least in part, that one or more actions 250B are to be initiated, circuitry 120 and/or 118 may issue, at least in part, one or more requests 170 to one or more controllers 172. One or more requests 170 may specify, request, command, and/or indicate, at least in part, that one or more controllers 172 are to execute, at least in part, one or more power management actions 250B. In response, at least in part, to one or more requests 170, one or more controllers 172 may execute, at least in part, one or more power management actions 250B. For example, as stated previously, one or more actions 250B may comprise modifying, at least in part, one or more currently enabled power management configurations to accommodate, at least in part, the one or more latency policies 260B associated, at least in part, with the one or more patterns 252B. For example, if one or more configurations 150B are not currently enabled, one or more actions 250B may comprise exiting the one or more currently enabled power management configurations and entering, at least in part, one or more power management configurations 150B. Conversely, if one or more configurations 150B are currently enabled, one or more actions 250B may comprise maintaining enablement, at least in part, of one or more configurations 150B. While one or more configurations 150B are enabled, circuitry 118 and/or circuitry 120 may store received packet traffic for later processing by the CPU 12 (e.g., when one or more configurations 150N are enabled at a later time, e.g., as a result of the periodically generated interrupt signal).

Thus, an embodiment may include network controller circuitry that may be comprised, at least in part, in a host computer. The circuitry may determine, at least in part, based at least in part upon at least one comparison, whether at least one power management action is to be initiated. The at least one comparison may compare, at least in part, at least one pattern with at least one portion of at least one packet received, at least in part, by the host computer. The at least one power management action may include the modification, at least in part, of at least one power management configuration of the host computer. The modification may accommodate, at least in part, at least one packet processing latency policy associated, at least in part, with the at least one pattern.

Thus, in this embodiment, circuitry 118 and/or 120 may be capable of disabling, modifying, and/or enabling the one or more power modes implemented, at least in part, by the one or more controllers 172, based at least in part, upon detected packet flow (and/or other) information contained in one or more packets received by the host 10 and/or the number of packets received during predetermined time intervals that contain such information. Advantageously, in this embodiment, this may permit usage models and/or power management configurations involving such power modes to be selected by circuitry 118 and/or 120, and/or executed by one or more controllers 172, based at least in part upon previously selected criteria and/or packet processing latency policies tailored to such information. Advantageously, this may permit the host to be placed into desired power modes attuned to and/or associated with such criteria and/or latency policies, depending upon the type of packet traffic being received by the host. Also advantageously, in this embodiment, this may permit the amount of user time and/or effort consumed to design and/or implement power management schemes to be reduced, without adversely affecting desired packet processing performance.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
    network controller circuitry to be comprised, at least in part, in a host computer, the circuitry being to determine, at least in part, based at least in part upon at least one comparison, whether at least one power management action is to be initiated, the at least one comparison being to compare, at least in part, at least one pattern with at least one portion of at least one packet received, at least in part, by the host computer, the at least one power management action including modification, at least in part, of at least one power management configuration of the host computer, the at least one power management configuration being enabled, at least in part, prior to the modification, the modification being to accommodate, at least in part, at least one packet processing latency policy associated, at least in part, with the at least one pattern;
    the modification resulting, at least in part, in enablement, at least in part, of at least one other power management configuration of the host computer; and
    while the at least one power management configuration is enabled, at least in part, the circuitry is to store received packet traffic for later processing when the at least one other power management configuration is enabled, at least in part.

2. The apparatus of claim 1, wherein:
    if the circuitry determines, at least in part, that the at least one power management action is to be initiated, the circuitry is to issue, at least in part, at least one request to at least one power management controller in the host computer, the at least one power management controller being to execute, at least in part, the at least one power management action in response, at least in part, to the at least one request; and the at least one comparison comprises a plurality of comparisons to compare, at least in part, a plurality of patterns with the at least one portion of the at least one packet, the plurality of patterns being associated, at least in part, with a plurality of packet processing latency policies, the policies being associated, at least in part, with a plurality of power management configurations that are associated, at least in part, with power modes of a host central processing unit comprised in the host computer.

3. The apparatus of claim 2, wherein:

determination, at least in part, by the circuitry, of whether the at least one power management action is to be initiated, is also based at least in part upon whether respective numbers of packets comprising the patterns are received by the host computer during respective time periods associated, at least in part, with the respective patterns.

4. The apparatus of claim 1, wherein:

the at least one comparison comprises a plurality of comparisons to compare, at least in part, a plurality of patterns with the at least one portion of the at least one packet, the plurality of patterns being associated, at least in part, with a plurality of packet processing latency policies, the policies being associated, at least in part, with a plurality of power management configurations that are associated, at least in part, with power modes of a host central processing unit comprised in the host computer; and the circuitry comprises packet filter circuitry to detect, at least in part, the patterns.

5. The apparatus of claim 4, wherein:

the patterns comprise, at least in part, one or more values associated, at least in part, with at least one of the following:
one or more source addresses;
one or more destination addresses;
one or more source ports;
one or more destination ports;
one or more virtual local area network (VLAN) tags;
one or more Ethernet types; and
one or more protocol types.

6. The apparatus of claim 5, wherein:

the host computer comprises a circuit board; and
the circuitry is comprised, at least in part, in a circuit card to be coupled to the circuit board.

7. A method comprising:

determining, at least in part, by network controller circuitry, based at least in part upon at least one comparison, whether at least one power management action is to be initiated, the circuitry to be comprised, at least in part, in a host computer, the at least one comparison being to compare, at least in part, at least one pattern with at least one portion of at least one packet received, at least in part, by the host computer, the at least one power management action including modification, at least in part, of at least one power management configuration of the host computer, the at least one power management configuration being enabled, at least in part, prior to the modification, the modification being to accommodate, at least in part, at least one packet processing latency policy associated, at least in part, with the at least one pattern;

the modification resulting, at least in part, in enablement, at least in part, of at least one other power management configuration of the host computer; and while the at least one power management configuration is enabled, at least in part, the circuitry is to store received packet traffic for later processing when the at least one other power management configuration is enabled, at least in part.

8. The method of claim 7, wherein:

if the circuitry determines, at least in part, that the at least one power management action is to be initiated, the circuitry is to issue, at least in part, at least one request to at least one power management controller in the host computer, the at least one power management controller being to execute, at least in part, the at least one power management action in response, at least in part, to the at least one request; and the at least one comparison comprises a plurality of comparisons to compare, at least in part, a plurality of patterns with the at least one portion of the at least one packet, the plurality of patterns being associated, at least in part, with a plurality of packet processing latency policies, the policies being associated, at least in part, with a plurality of power management configurations that are associated, at least in part, with power modes of a host central processing unit comprised in the host computer.

9. The method of claim 8, wherein:

determination, at least in part, by the circuitry, of whether the at least one power management action is to be initiated, is also based at least in part upon whether respective numbers of packets comprising the patterns are received by the host computer during respective time periods associated, at least in part, with the respective patterns.

10. The method of claim 7, wherein:

the at least one comparison comprises a plurality of comparisons to compare, at least in part, a plurality of patterns with the at least one portion of the at least one packet, the plurality of patterns being associated, at least in part, with a plurality of packet processing latency policies, the policies being associated, at least in part, with a plurality of power management configurations that are associated, at least in part, with power modes of a host central processing unit comprised in the host computer; and the circuitry comprises packet filter circuitry to detect, at least in part, the patterns.

11. The method of claim 10, wherein:

the patterns comprise, at least in part, one or more values associated, at least in part, with at least one of the following:
one or more source addresses;
one or more destination addresses;
one or more source ports;
one or more destination ports;
one or more virtual local area network (VLAN) tags;
one or more Ethernet types; and
one or more protocol types.

12. The method of claim 11, wherein:

the host computer comprises a circuit board; and
the circuitry is comprised, at least in part, in a circuit card to be coupled to the circuit board.

13. Computer-readable memory storing one or more instructions that when executed by a machine result in performance of operations comprising:

determining, at least in part, by network controller circuitry, based at least in part upon at least one comparison, whether at least one power management action is to be initiated, the circuitry to be comprised, at least in part, in a host computer, the at least one comparison being to compare, at least in part, at least one pattern with at least one portion of at least one packet received, at least in part, by the host computer, the at least one power management action including modification, at least in part, of at least one power management configuration of the host computer, the at least one power management configuration being enabled, at least in part, prior to the modification, the modification being to accommodate, at least in part, at least one packet processing latency policy associated, at least in part, with the at least one pattern;

the modification resulting, at least in part, in enablement, at least in part, of at least one other power management configuration of the host computer; and     while the at least one power management configuration is enabled, at least in part, the circuitry is to store received packet traffic for later processing when the at least one other power management configuration is enabled, at least in part.

14. The memory of claim 13, wherein:

if the circuitry determines, at least in part, that the at least one power management action is to be initiated, the circuitry is to issue, at least in part, at least one request to at least one power management controller in the host computer, the at least one power management controller being to execute, at least in part, the at least one power management action in response, at least in part, to the at least one request; and the at least one comparison comprises a plurality of comparisons to compare, at least in part, a plurality of patterns with the at least one portion of the at least one packet, the plurality of patterns being associated, at least in part, with a plurality of packet processing latency policies, the policies being associated, at least in part, with a plurality of power management configurations that are associated, at least in part, with power modes of a host central processing unit comprised in the host computer.

15. The memory of claim 14, wherein:

determination, at least in part, by the circuitry, of whether the at least one power management action is to be initiated, is also based at least in part upon whether respective numbers of packets comprising the patterns are received by the host computer during respective time periods associated, at least in part, with the respective patterns.

16. The memory of claim 13, wherein:

the at least one comparison comprises a plurality of comparisons to compare, at least in part, a plurality of patterns with the at least one portion of the at least one packet, the plurality of patterns being associated, at least in part, with a plurality of packet processing latency policies, the policies being associated, at least in part, with a plurality of power management configurations that are associated, at least in part, with power modes of a host central processing unit comprised in the host computer; and the circuitry comprises packet filter circuitry to detect, at least in part, the patterns.

17. The memory of claim 16, wherein:

the patterns comprise, at least in part, one or more values associated, at least in part, with at least one of the following:

one or more source addresses;

one or more destination addresses;

one or more source ports;

one or more destination ports;

one or more virtual local area network (VLAN) tags;

one or more Ethernet types; and one or more protocol types.

18. The memory of claim 17, wherein:

the host computer comprises a circuit board; and the circuitry is comprised, at least in part, in a circuit card to be coupled to the circuit board.

* * * * *